(12) United States Patent
Girvan et al.

(10) Patent No.: US 7,404,902 B2
(45) Date of Patent: Jul. 29, 2008

(54) METHOD FOR TREATING WATER

(75) Inventors: Don H. Girvan, St. Augustine, FL (US); Paul J. Nederveld, Kentwood, MI (US); Arthur F. Harre, III, Rockford, MI (US)

(73) Assignee: Haviland Consumer Products, Inc., Grand Rapids, MI (US)

( * ) Notice: Subject to any disclaimer, the term of this patent is extended or adjusted under 35 U.S.C. 154(b) by 320 days.

(21) Appl. No.: 11/261,213

(22) Filed: Oct. 28, 2005

(65) Prior Publication Data

US 2007/0095760 A1  May 3, 2007

(51) Int. Cl.
*C02F 1/56* (2006.01)
*C02F 1/76* (2006.01)
*C02F 103/42* (2006.01)

(52) U.S. Cl. ............ 210/699; 205/618; 205/742; 210/698; 210/700; 210/721; 210/725; 210/728; 210/754; 210/764; 422/15

(58) Field of Classification Search ............... 210/699
See application file for complete search history.

(56) References Cited

U.S. PATENT DOCUMENTS

| | | | |
|---|---|---|---|
| 2,988,471 A | 6/1961 | Fuchs et al. ............... 167/17 |
| 3,560,381 A | 2/1971 | Winters, Jr. et al. ......... 252/8.1 |
| 4,014,676 A | 3/1977 | Carter et al. ............... 71/67 |
| 4,119,535 A | 10/1978 | Whlte et al. ............... 210/62 |
| 4,172,094 A | 10/1979 | Dybas et al. ............... 424/330 |
| 4,389,318 A | 6/1983 | Wojtowlcz ............... 210/755 |
| 4,594,091 A | 6/1986 | Girvan ............... 71/67 |
| 5,021,186 A | 6/1991 | Ota et al. ............... 252/186.35 |
| 5,066,408 A | 11/1991 | Powell ............... 210/765 |
| 5,131,938 A | 7/1992 | Girvan ............... 71/67 |
| 5,352,409 A | 10/1994 | Klerzkowskl ............... 422/14 |
| 5,362,368 A | 11/1994 | Lynn et al. ............... 204/98 |
| 5,670,059 A | 9/1997 | Jones et al. ............... 210/753 |
| 5,674,429 A | 10/1997 | Lachocki et al. ........ 252/186.28 |
| 5,851,406 A | 12/1998 | Jones et al. ............... 210/755 |
| 6,022,480 A * | 2/2000 | Girvan et al. ............... 210/756 |
| 6,120,698 A * | 9/2000 | Rounds et al. ............... 252/181 |
| 6,409,926 B1 * | 6/2002 | Martin ............... 210/709 |
| 6,426,317 B1 | 7/2002 | Garris et al. ............... 504/227 |
| 6,533,958 B2 * | 3/2003 | Shim et al. ............... 252/176 |
| 6,727,219 B2 * | 4/2004 | Buckland et al. ............ 510/439 |
| 6,749,758 B2 | 6/2004 | Howarth et al. ............. 210/746 |
| 6,843,925 B2 | 1/2005 | Bonelll et al. ............... 210/752 |
| 6,863,830 B1 * | 3/2005 | Purdy et al. ................. 210/756 |
| 7,238,287 B2 * | 7/2007 | Kulperger ................ 210/632 |
| 7,238,290 B2 * | 7/2007 | Rawat et al. ............... 210/759 |
| 2004/0118787 A1 | 6/2004 | Bonelll et al. ............... 210/764 |
| 2006/0054569 A1 | 3/2006 | Kulperger ................ 210/755 |

* cited by examiner

*Primary Examiner*—Peter A. Hruskoci
(74) *Attorney, Agent, or Firm*—Price, Heneveld, Cooper, DeWitt & Litton, LLP

(57) ABSTRACT

A composition for treating water contained in enclosures, such as swimming pools, spas, whirlpool tubs and cooling towers, which includes at least one boron compound, cyanuric acid, at least one mineral remover and at least one clarifier is provided. A composition and method for treating salt water contained in enclosures using halogen generators to generate sterilizing halogen in situ, wherein the method includes adding to the water effective amounts of a composition having at least one boron compound, cyanuric acid, at least one mineral remover and at least one clarifier, such that they are present in the water simultaneously is also provided.

9 Claims, No Drawings

METHOD FOR TREATING WATER

BACKGROUND OF THE INVENTION

This invention relates to the field of treatment of water contained in enclosures. Such enclosures are typically swimming pools, spas, whirlpool tubs and cooling towers.

Boron and halogen-containing compounds, specifically chlorine-containing compounds, are often added to water contained in enclosures such as swimming pools, spas, whirlpool tubs, and cooling towers to inhibit bacteria, algae and fungal growth. However, in order to be effective against microorganisms such as bacteria, algae and fungus, it is necessary to maintain a particular concentration of halogen in the water. Using chlorine in swimming pools, for example, it is desirable to maintain an available chlorine content of about 0.4 to about 1.5 parts per million (ppm). Although boron and halogen-containing compounds, such as chlorine-containing compounds, are excellent water treatment agents, there are several inherent problems. For example, chlorine which has been directly added to a pool as elemental chlorine or as a hypochlorite, will gradually degrade. This loss of chlorine is accelerated in direct sunlight. Thus, it is necessary to continuously replace the lost chlorine. Another disadvantage of treating water in enclosures by direct addition of chlorine to the water is that the chlorine reacts with the water to form hydrochloric acid. The formation of hydrochloric acid causes a drop in the pH of the water and makes acid-base balancing difficult. Thus, when using chlorine as a water treatment agent, it is also necessary to add a buffer system to the water in order to maintain a proper pH level.

Another method of controlling water-borne microorganisms is through the use of halogen-substituted organics such as trichloro-S-triazinetrione, bromochlorodimethylhydantoin and trichloroisocyanuric acid (TCCA). This class of water treatment agents do not dissipate as rapidly as other chlorine and boron-containing compounds and are much easier to handle and to store. However, they can be quite expensive and a buffering system is still required to maintain a proper pH level.

Yet another method of treating water involves the use of chlorine generators in salt-water enclosures, such as pools or spas. Chlorine generators use electrolysis to produce chlorine/hypochlorous acid directly into the pool or spa from a low concentration of salt added to the water. Electrolysis takes place in an electrolytic cell installed inline in the recirculation system. Inside the cell are layers of metal plates electrically charged by a separate power supply. Preferably, a salt concentration of about 2500 ppm to about 6000 ppm in the water contained in the enclosure is maintained for the chlorine generator to operate effectively.

Chlorine generators create a better, healthier swimming or bathing experience for most people. It is not necessary to handle or buy chlorine or chlorine-containing compounds, and if the unit is functioning correctly, sufficient chlorine will be present in the enclosure to inhibit bacteria, algae and fungal growth. Unfortunately, the chlorine generators tend to become inefficient too quickly, due to corrosion of their special electrolyte plates.

SUMMARY OF THE INVENTION

Applicants have discovered a composition and method for treating salt water contained in enclosures, such as swimming pools, spas, whirlpool tubs and cooling towers, which extend the effective life of the chlorine generators and simultaneously help maintain a proper chemical balance in the water. The composition used includes at least one boron compound, cyanuric acid, at least one mineral remover and at least one clarifier.

These and other features, advantages, and objects of the present invention will be further understood and appreciated by those skilled in the art by reference to the following specification and claims.

DETAILED DESCRIPTION OF PREFERRED EMBODIMENT

The composition of the present invention includes at least one boron-containing and releasing compound, cyanuric acid, at least one mineral remover, and at least one clarifier.

The composition is especially effective in treating salt water contained in enclosures, such a swimming pools, spas, and whirlpool tubs, which use chlorine generators to generate sterilizing chlorine in situ.

Boron compounds are known to act as buffering agents for pH. Boron compounds are also effective in controlling algal growth as discussed in U.S. Pat. Nos. 4,594,091 and 5,131,938 to Girvan, both of which are hereby incorporated by reference. Boron compounds also protect metals, such as those present in the electrolytic cell of chlorine generators, from corrosion. While any boron-containing and releasing compound may be suitable in the composition of the present invention, preferably boric acid and its derivatives are used. Suitable boric acid derivatives include sodium tetraborate pentahydrate, sodium tetraborate decahydrate, sodium tetraborate anhydrous, calcium borate, sodium calcium borate, sodium metaborate, disodium octaborate tetrahydrate, ammonium tetraborate, ammonium pentaborate, potassium tetraborate, potassium pentaborate, zinc borate, zinc perborate, sodium perborate anhydrous, sodium perborate monohydrate, and sodium perborate tetrahydrate. In a preferred embodiment, the composition includes about 56% to about 94% of at least one boron compound by weight of the composition, more preferably about 70% to about 94%, and most preferably about 80% to about 94% of at least one boron compound by weight of the composition.

Borate derivatives are alkaline in nature and therefore, addition of a borate derivative to water would raise the pH level of the water. To obtain a neutral pH that does not upset the water pH balance and preferably serves as a buffer for pH control in the water, preferably a combination of boric acid and at least one boric acid derivative is used. It has been found that a ratio of about one part boric acid derivative, specifically sodium tetraborate pentahydrate, to about four parts boric acid will achieve a neutral pH. When both sodium tetraborate pentahydrate and boric acid are used, preferably the composition includes about 13% to about 44% sodium tetraborate pentahydrate by weight of the composition, more preferably about 13% to about 20%, and most preferably about 15% to about 19% sodium tetraborate pentahydrate by weight of the composition. Preferably, the composition includes about 43% to about 74% boric acid by weight of the composition, more preferably about 65% to about 74%, and most preferably about 68% to about 72% boric acid by weight of the composition.

In addition to using a combination of boric acid and boric acid derivative, a neutral pH may also be obtained by using a combination of a boric acid derivative and an acid mineral remover or other acid salt such as sodium bisulfate. However, using an acid mineral remover or other acid salt will result in a lower boron level than if boric acid is used.

The composition of the present invention also includes cyanuric acid. Cyanuric acid is a stabilizer for chlorine and enhances chlorine longevity, especially in the presence of sunlight, which can destroy chlorine present in the water. Preferably, the composition does not include TCCA. Preferably, the concentration of cyanuric acid in the water is about 10 ppm to about 100 ppm. Quantities greater than about 100 ppm may lead to "chlorine lock," a condition which renders further chlorine addition ineffective. More preferably, the concentration of cyanuric acid in the water is about 20 ppm to about 80 ppm cyanuric acid, and most preferably about 30 ppm to about 50 ppm cyanuric acid. The composition of the present invention preferably includes about 5% to about 30% cyanuric acid by weight of the composition, more preferably about 5% to about 20% cyanuric acid, and most preferably about 8% to about 12% cyanuric acid by weight of the composition. The amount of cyanuric acid present in the composition may influence the pH of the treated water. Table 1 illustrates the concentration of cyanuric acid in water, where about 25 lbs. of a composition made in accordance with the present invention is added to about 25,000 gallons of water, for varying amounts of cyanuric acid in the composition.

TABLE 1

| % Cyanuric Acid in a Composition of the Present Invention | Concentration of Cyanuric Acid in Water (ppm) |
|---|---|
| 5% | 15 |
| 10% | 30 |
| 15% | 45 |
| 20% | 60 |
| 25% | 75 |
| 30% | 90 |

The composition of the present invention also includes at least one mineral remover. A build up of minerals and salt may result in water turbidity and scaling on surfaces of the enclosure. Scale is a precipitate that forms on surfaces which are in contact with water such as an enclosure. Scale is caused by excessive calcium or alkalinity. Excessive amounts of minerals and scale can also contribute to corrosion of halogen generator electrodes. As water and salt are added to keep the water level in the enclosure constant and the solution conductive enough for the chlorine generator to work, certain minerals including heavy metals, inherent in water, and salt may build up to unacceptable levels. Accordingly, mineral control agents are included in the composition of the present invention. Mineral removers suitable for use in the present invention include citrates, phosphonates, and aminocarboxylates. Suitable citrates include citric acid and citric acid salts, such as trisodium citrate, potassium citrate, monoammonium citrate, diammonium citrate, monoethanolamine citrate, and diethanolamine citrate. Suitable phosphonates include 1-hydroxyethylidene-1,1-diphosphonic acid (HEDP), tetrasodium salt of HEDP, aminotri(methylenephosphonic acid) (ATMP), pentasodium salt of ATMP, and 2-phosphono-1,2,4-butanetricarboxylic acid (PBTC). Suitable aminocarboxylates include ethylenediaminetetraacetic acid (EDTA), tetrasodium EDTA, diammonium EDTA, tetraammonium EDTA, hydroxyethylenediaminetriacetic acid (HEDTA), and nitriloatriacetate trisodium salt. Other suitable mineral removers include oxalic acid, sodium gluconate, gluconic acid, tartaric acid, ascorbic acid and erythorbic acid. Oxalic, ascorbic, and erythorbic acids can be used to remove iron.

The amount of mineral remover in the composition may vary depending on the hardness of the untreated water contained in the enclosure. For example, water with a high level of hardness, such as well water, may need a higher percentage of mineral remover in the composition. Preferably the composition includes about 1% to about 3% mineral remover by weight of the composition, more preferably about 1.5% to about 2.5% mineral remover, and most preferably about 2% mineral remover by weight of the composition. In a preferred embodiment, the mineral remover is HEDP.

The composition of the present invention also includes at least one clarifier. Clarifiers take small particles such as soil, insoluble material complexes, and dead algae that are suspended in water and form a turbid, cloudy appearance. These particles are anionic in nature and are attracted to chemical compounds having a positive charge. The particles and chemical compounds combine and either precipitate to the bottom of the enclosure or are caught in the enclosure's water filtration system. The removal of these small suspended particles allows the sanitizing system to work more efficiently because the sanitizing halogen, such as chlorine, is not spent on these materials, but rather on bacteria, algae and fungus. Clarifiers can be inorganic materials, such as aluminum salts, including aluminum sulfate, aluminum chloride and polyaluminum chloride. Clarifiers can also be water-soluble organic polyelectrolytes such as chitin derivatives and dimethyl diallyl ammonium chloride (DMDAAC). It is probable that persons will ingest at least a small portion of treated water from the swimming pool or other enclosure. Accordingly, the concentration of clarifier in the water should be below potable water minimum levels. The composition of the present invention preferably includes about 0.1% to about 0.3% clarifier by weight of the composition, more preferably about 0.015% to about 0.025% clarifier, and most preferably about 0.2% clarifier by weight of the composition. In a preferred embodiment the clarifier is a synthetic polymer, such as poly-DMDAAC.

Additives such as fragrances and dyes may also be included in the composition for consumer appeal. Preferably, any additives added are non-toxic and do not sensitize the skin.

Table 2 shows four compositions made in accordance with the present invention.

TABLE 2

| % Ingredient | Composition | | | |
|---|---|---|---|---|
| | A | B | C | D |
| Boric Acid | 69.76 | 53.76 | 73.76 | 43.6 |
| Sodium Tetraborate Pentahydrate | 17.44 | 13.44 | 18.44 | 43.6 |
| Cyanuric Acid | 10 | 30 | 5 | 10 |
| HEDP | 2 | 2 | 2 | 2 |
| Dye | 0.5 | 0.5 | 0.5 | 0.5 |
| Poly-DMDAAC | 0.2 | 0.2 | 0.2 | 0.2 |
| Fragrance | 0.1 | 0.1 | 0.1 | 0.1 |

Using the method of the present invention, initially, a consumer adds about 25 pounds of the composition to about 10,000 gallons of salt water. The composition of the present invention may be added to the salt water in granular form. Alternatively, the composition may be in the form of a compressed stick, puck or tablet. Upon addition of the composition to the salt-water, the pH of the water is preferably about 6.8 to about 8.2 and more preferably about 7.2 to about 7.6. Preferably, the concentration of boron in the water is about 30 ppm to about 50 ppm and more preferably about 33 ppm to about 47 ppm. As previously noted, the concentration of cyanuric acid in the water is preferably about 10 ppm to about 100 ppm.

More preferably, the concentration of cyanuric acid in the water is about 20 ppm to about 80 ppm cyanuric acid, and most preferably about 30 ppm to about 50 ppm cyanuric acid. The concentration of total mineral remover in the water is preferably about 3 ppm to about 9 ppm, more preferably about 5 ppm to about 7 ppm, and most preferably about 6 ppm. The concentration of total clarifier in the water is preferably about 0.03 ppm to about 0.09 ppm, more preferably about 0.05 ppm to about 0.07 ppm, and most preferably about 0.06 ppm. Table 3 shows the concentration of boron, cyanuric acid, mineral remover, and clarifier when about 25 pounds of the compositions of Table 2 are added to about 10,000 gallons of water.

TABLE 3

| Ingredient | Concentration of Ingredient in Compositions (ppm) | | | |
| --- | --- | --- | --- | --- |
| | A | B | C | D |
| Boron | 45 | 34 | 47 | 42 |
| Cyanuric Acid | 30 | 90 | 15 | 30 |
| Mineral Remover | 6 | 6 | 6 | 6 |
| Clarifier | 0.06 | 0.06 | 0.06 | 0.06 |

Periodic testing to determine the cyanuric acid, boron and pH levels is required. The composition is added as necessary to the water to maintain the desired pH and concentration levels. It is believed that it is necessary to add the composition of the present invention to water contained in an enclosure using halogen generators only once or twice a year. However, depending on bather load and weather conditions the composition may be added more than twice a year.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A method for treating water contained in an enclosure which uses halogen generators including metal electrolytic plates to generate sterilizing halogen in situ, comprising the steps of:
   providing a composition comprising:
      at least one boron compound;
      cyanuric acid;
      at least one mineral remover; and
      at least one clarifier;
   adding to the water effective amounts of the composition such that the at least one boron compound, cyanuric acid, at least one mineral remover, and at least one clarifier are present in the water simultaneously, to inhibit bacteria, algae, and fungal growth, and wherein said boron compound protects said metal electrolytic plates from corrosion.

2. The method for treating water of claim 1, wherein the composition comprises:
   from about 56% to about 94% of at least one boron compound;
   from about 5% to about 30% cyanuric acid;
   from about 1% to about 3% of at least one mineral remover; and
   from about 0.1% to about 0.3% of at least one clarifier.

3. The method for treating water of claim 2, wherein the at least one boron compound comprises boric acid and sodium tetraborate pentahydrate, and wherein the ratio of boric acid to sodium tetraborate pentahydrate is about 1:1 to about 4:1.

4. The method for treating water of claim 3, wherein the at least one mineral remover comprises 1-hydroxyethylidene-1, 1-diphosphonic acid (HEDP) and the at least one clarifier comprises dimethyl diallyl ammonium chloride (DMDAAC).

5. The method for treating water of claim 1, wherein the composition comprises:
   from about 43% to about 74% boric acid;
   from about 13% to about 44% sodium tetraborate, pentahydrate;
   from about 5% to about 30% cyanuric acid;
   from about 1% to about 3% HEDP; and
   from about 0.1% to about 0.3% DMDAAC.

6. The method for treating water of claim 5, wherein the composition comprises:
   from about 65% to about 74% boric acid;
   from about 13% to about 20% sodium tetraborate, pentahydrate;
   from about 8% to about 12% cyanuric acid;
   from about 1% to about 3% HEDP; and
   from about 0.1% to about 0.3% DMDAAC.

7. The method for treating water of claim 1, further comprising the step of treating the water to a pH of about 7.2 to about 7.6.

8. The method of treating water of claim 1, further comprising the step of treating the water to a concentration of:
   about 30 ppm to about 50 ppm boron;
   about 20 ppm to about 80 ppm cyanuric acid;
   about 3 ppm to about 9 ppm mineral remover; and
   about 0.03 ppm to about 0.09 ppm clarifier.

9. The method of treating water of claim 8, wherein the concentration of cyanuric acid is about 30 ppm to about 50 ppm.

* * * * *